US005168603A

United States Patent [19]

Reed

[11] Patent Number: 5,168,603

[45] Date of Patent: Dec. 8, 1992

[54] BUNDLING TIE

[75] Inventor: Brian E. Reed, New Hartford, Conn.

[73] Assignee: The Siemon Company, Watertown, Conn.

[21] Appl. No.: 683,418

[22] Filed: Apr. 8, 1991

[51] Int. Cl.$^5$ .............. B65D 63/00

[52] U.S. Cl. .............. 24/16 R; 24/16 PB; 24/306; 24/442

[58] Field of Search .............. 24/16 R, 16 PB, 17 AP, 24/30.5 P, 442, 306; 248/74.3

[56] References Cited

U.S. PATENT DOCUMENTS

| | | | |
|---|---|---|---|
| 1,999,034 | 4/1935 | Clark | 24/90 A |
| 3,006,048 | 10/1961 | Windish | 24/16 PB |
| 3,372,438 | 3/1968 | Rinecker | 24/16 R |
| 3,601,863 | 8/1971 | Dorsey | 24/16 PB |
| 3,835,505 | 9/1974 | Shewbridge | 24/16 R |
| 4,236,280 | 12/1980 | Kreiseder | 24/16 PB |
| 4,700,432 | 10/1987 | Fennell | 24/16 PB |
| 4,780,935 | 11/1988 | Palombit | 24/17 AP |
| 4,815,172 | 3/1989 | Ward | 24/16 R |
| 4,939,818 | 7/1990 | Hahn | 24/442 |
| 4,942,644 | 7/1990 | Rowley | 24/30.5 P |
| 5,048,158 | 9/1991 | Koerner | 24/16 R |

FOREIGN PATENT DOCUMENTS

| | | | |
|---|---|---|---|
| 1435102 | 3/1966 | France | 24/16 PB |
| 1108514 | 4/1968 | United Kingdom | 24/16 PB |

*Primary Examiner*—Victor N. Sakran
*Attorney, Agent, or Firm*—Fishman, Dionne & Cantor

[57] ABSTRACT

A bundling tie for bundling a plurality of elongated members such as wires and cable is presented. The bundling tie is easily detachable by hand and reusable. The bundling tie comprises a flexible strap member which is secured to an anchor member (e.g., cable, wire, tube, etc.) by inserting one end of the strap through a slit in the strap, thereby circumferentially engaging the strap to the anchor. The strap is then wrapped around a bundle of additional elongated members and secured by a hook and loop (VELCRO) attachment.

11 Claims, 1 Drawing Sheet

30
54
50
36
56
46

BUNDLING TIE

BACKGROUND OF THE INVENTION

The present invention relates generally to bundling devices and, more particularly to a bundling device for bundling elongate members such as electric wires, cables, tubes, etc.

Fastening and bundling devices are well known in the present art and in unrelated arts. Examples from the present art are represented by U.S. Pat. Nos. 4,138,770 (Feb. 13, 1979); 4,092,765 (Jun. 6, 1978); and 3,892,011 (Jul. 1, 1975). These prior art devices can all be classified as ratchet teeth devices and are characterized by having a relatively rigid head and an integrally attached strap having a series of ratchet teeth on its inner surface which engage a series of complementary ratchet teeth on a pawl member positioned within a transverse slot through the head. Once the complementary ratchet teeth are engaged, they cannot be disengaged without severing, and thereby destroying, the device.

When these prior art devices are used to secure elongate members, such as a cable, in a bundle with other elongate members, such as in a coil, they must be destroyed in order to unbundle the elongate members. This is not a problem where the elongate members are intended to remain bundled. Where, however, the elongate members are bundled and unbundled in the course of use, a new bundling tie must be used each time. This lack of reusability may be quite undesirable from the standpoint of both high cost and the necessity for workers in the field to constantly carry large numbers of new bundling devices.

Fortunately, the prior art has addressed and attempted to solve the problem of lack of reusability. An example of which is a device similar to the non-reusable ties but having an adaptation enabling one to disengage the ratchet teeth with a special tool. Although such prior art devices are reusable, they share a problem associated with the ratchet teeth devices in that once they are disengaged they are also removed from the elongate member. This requires that the device be located, if it has not been lost, in order to secure the bundled elongate members.

This latter problem has been addressed by providing a "loop" in one end of a peel-resistant tape assembly tie for attaching the tie to a cord or cable. (This tape is commonly refereed to by the trademark VELCRO, and is described in U.S. Pat. No. 3,372,438 (Mar. 12, 1968)). These loops are of a fixed diameter however and often require removal of larger diameter devices, such as electric plugs, before the tie may be attached to the elongate member. Also, this device randomly slides along the member and must be found with each use. There is therefore a need for a reusable bundling device which is securely, semi-permanently attached to an elongate member when it is in the unbundled state, thus eliminating the need to "find" a bundling device with each intended use.

The prior art has addressed this problem by the device disclosed in U.S. Pat. No. 4,700,432 (Oct. 20, 1987). This device comprises a flexible strap having a first portion permanently attached to a second portion; the first portion having hooks and the second portion having loops for providing a VELCRO type attachment. A transverse slot in the second portion receives a tie of a type disclosed in U.S. Pat. Nos. 4,138,770, 4,092,765 and 3,892,011. A pull tab is permanently attached to one end of the first portion.

During operation of this prior art strap, the tie is attached to an anchor member (e.g , wire) and once attached can only be removed with the aid of a tool. The strap is then wrapped around the other elements to be bundled and attached by the hook and loop attachment means described hereinbefore.

This device is not completely reusable without the aid of a tool to remove the tie. The device is otherwise only reusable at the location where the tie was anchored. Thus, rebundling of different groups of wires (i.e., members) is not always available without the aid of the tool. Further, reusing the tie at a different location is also not available without the aid of this tool.

Other examples of reusable bundling devices are found in unrelated arts. Such devices generally employ known hook and loop materials. Examples of such devices are found in U.S. Pat. Nos. 4,114,838 (Sep. 19, 1978), 4,096,863 (Jun. 27, 1978), 4,088,136 (May 9, 1978), 3,994,048 (Nov. 30,1976), 3,942,636 (Mar. 9, 1976), 3,731,348 (May 8, 1973) and 3,279,008 (Oct. 18, 1966).

SUMMARY OF THE INVENTION

The above-discussed and other drawbacks and deficiencies of the prior art are overcome or alleviated by the bundling tie of the present invention. In accordance with the bundling tie of the present invention, a tie or strap having a selected length includes a first portion comprising a plurality of hooks and a second portion comprising a plurality of loops. The strap includes opposed first and second surfaces with the hooks extending outwardly from the first surface and the loops extending outwardly from a second surface. The hook and loop attachment is sometimes referred to as a VELCRO attachment. The second portion of the strap has an opening, preferably an elongated slit adapted in size and shape to receive the first portion of the strap.

During use, the first portion of the strap is inserted through the slit to define a loop and an anchor cable is disposed within the formed loop. The first portion is then pulled through the slot until the loop is secured onto the anchor cable. The strap is then wrapped around the other cables (i.e., members) in the desired bundle and secured by the VELCRO attachment.

The present invention has numerous features and advantages relative to the prior art. For example, the present invention is a one piece anchor tie as opposed to the prior art two piece anchor tie. Moreover, the tie of the present invention can be completely removed (i.e., including from the anchor cable) by hand without the aid of any tool. The prior art required a tool to remove the tie from the anchor cable. The present invention thus provides low cost and ease of use.

The above discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several figures.

DESCRIPTION OF THE PREFERRED EMBODIMENT

Figure 1:
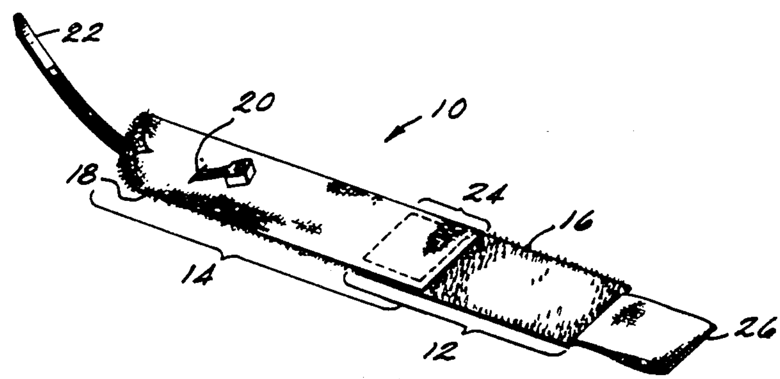
FIG. 1 is a perspective view of the prior art bundling tie taken from FIG. 2 of U.S. Pat. No. 4,700,432.

Referring to FIG. 1, herein labeled prior art, the bundling tie of U.S. Pat. No. 4,700,432 is shown. This prior art bundling tie comprises a flexible strap 10 having a first portion 12 permanently attached to a second portion 14. Portion 12 has hooks 16 and portion 14 has loops 18 for providing a VELCRO type attachment. A transverse slot 20 in portion 14 receives a tie 22 of a type disclosed in U.S. Pat. Nos. 4,138,770, 4,092,765 and 3,892,011. Portions 12 and 14 are permanently attached at area 24. A pull tab 26 is permanently attached to one end of portion 12.

During operation of the prior art strap 10, tie 22 is attached to an anchor member (e.g., wire) and once attached can only be removed with the aid of a tool. Portions 12 and 14 are then wrapped around the other elements to be bundled and attached by the VELCRO means described hereinbefore.

As mentioned hereinbefore, the prior art device of FIG. 1 is not completely reusable without the aid of a tool to remove tie 22. The device is otherwise only reusable at the location where tie 22 was anchored. Thus, rebundling of different groups of wires (i.e., members) is not always available without the aid of the tool. Further, reusing the tie at a different location is also not available without the aid of this tool.

Figure 2:
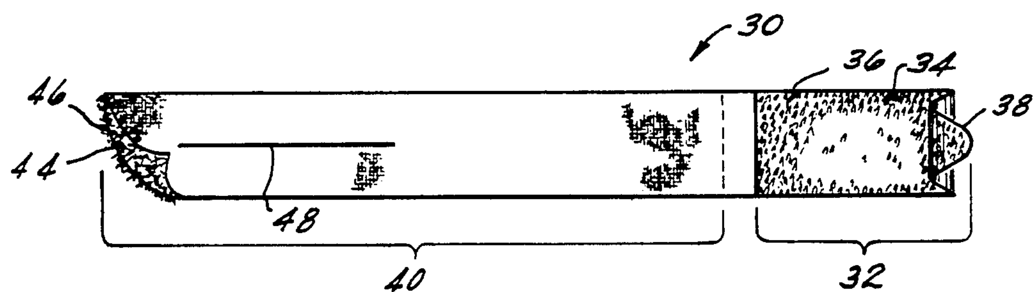
FIG. 2 is a top view of the bundling tie in accordance with the present invention.

Referring now to FIG. 2, a preferred embodiment of a bundling tie in accordance with the present invention is shown generally at 29. Bundling tie 29 includes a flexible strap member 30 having a preselected length and having opposed first and second surfaces 36 and 46. The length of strap 30 is divided between a first portion 32 and a second portion 40. First portion 32 includes a plurality of hooks 34 extending from first surface 36. Portion 32 of strap 30 further includes a pull tab 38 extending therefrom. Strap 30 may be a single piece or the two portions 32 and 40 may be permanently attached (as in FIGS. 2-4) at 42 by heat welding, by stitching or by a suitable adhesive (epoxy). Portion 40 has a plurality of loops 44 extending from second surface 46. This hook and loop attachment means is preferably a VELCRO type attachment means. Portion 40 also has an opening 48 adapted in size and shape to receive tab 38 followed by portion 32 of strap 30. As shown in FIG. 2, opening 48 may be oriented parallel to the longitudinal direction (or length) of strap 30.

Figures 3A, 3B, 4:
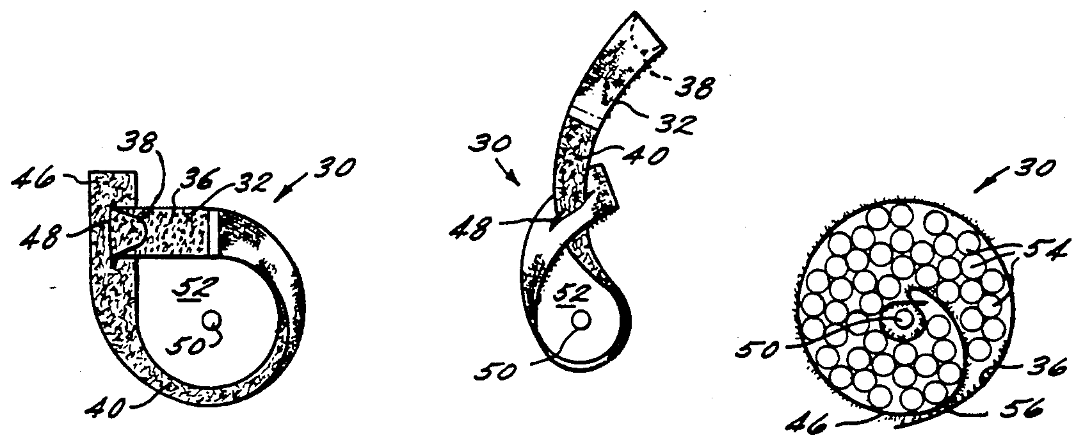
FIGS. 3A and 3B are perspective views of the tie of FIG. 2 being attached to an anchor cable.
FIG. 4 is a partially cut away view of a bundle being retained by the tie of FIG. 1.

Referring now to FIGS. 3A and 3B, during use, strap 30 is wrapped around an anchor member 50 (e.g., cable, wire, tube, etc.) and tab 38 is inserted into slit 48 forming a loop 52. Then, member 50 is positioned in loop 52 such that as tab 38 is pulled through slit 48, loop 52 is closed around member 50 until strap 30 is secured thereto. At this point, bundling tie 29 is securely attached to anchor member 50. Strap 30 may be removed from anchor 50 simply by pulling strap 30 back through slit 48.

Next and referring to FIG. 4, strap 30 is shown securing a bundle of members 54 (e.g., cable, wire, tube, etc). Strap 30 (secured on anchor 50) is wrapped around bundle 54 (with anchor 50 being located within the bundle) and attached to itself at a point 56. This attachment is the aforementioned VELCRO attachment whereby hooks 34 attach individually to loops 44 to secure bundle 54. Strap 30 may be removed from bundle 54 by pulling tab 38 away from bundle 54, thereby disengaging hooks 34 from loops 44. Strap 30 may be completely removed by further removing strap 30 from anchor 50 as described hereinbefore. Once strap 30 has been removed it may be reused (as described herein) at the same or at a different location.

Strap 30 is preferably available in a variety of colors to allow color coded installation in the field. Further, the length of strap 30 is dependent on the overall circumference of the desired bundle.

It will be appreciated that the positioning of the hook and loop materials may be reversed, that is, the hooks may be positioned in portion 40 and the loops may be positioned in portion 32.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A bundling tie comprising:

a flexible strap member having a preselected length and having opposed first and second surfaces, said strap member further being divided into first and second portions along said preselected length with said first portion terminating at said second portion;

an opening through said first or second portion of said flexible strap member for securing said flexible strap member to at least one elongated member wherein a first end of said strap member is inserted through said opening and pulled through said opening until said flexible strap member is circumferentially engaged onto a section of said elongated member;

detachable engagement means on said first and second portions, said detachable engagement means detachably engaging said first portion to said second portion and being adapted to circumferentially enclose a plurality of additional elongated members, wherein said detachable engagement means comprises;

a plurality of hooks disposed on said first portion of one of said surfaces of said strap member; and a plurality of loops disposed on said second portion of one of said surfaces of said strap member whereby said hooks detachably engage said loops.

2. The bundling tie of claim 1 further including:

pull tab means permanently attached to one end of said strap member.

3. The bundling tie of claim 1 wherein said detachable engagement means comprises:

a plurality of hooks disposed on the entirety of said first portion of said first surface; and a plurality of loops disposed on the entirety of said second portion of said second surface.

4. The bundling tie of claim 1 wherein:

said hooks are disposed on said first portion of said first surface of said strap member; and said loops are disposed on said second portion of said second surface of said strap member.

5. The bundling tie of claim 1 wherein:

said opening extends as a longitudinal slit along a section of said preselected length of said strap member.

6. The bundling tie of claim 1 wherein:

said first and second portions are discrete members which have been permanently attached to form said strap member.

7. The bundling tie of claim 1 wherein:

said first and second portions are color coded as a means of facilitating identification of the elongated members circumferentially enclosed by said bundling tie.

8. The bundling tie of claim 1 wherein:

one of said first and second portions includes a pull tab integrally formed therein.

9. The bundling tie of claim 1 wherein:

said flexible strap member has a rectangular shape.

10. The bundling tie of claim 1 wherein:

said flexible strap member has a width dimension, said width dimension being equal along the length of said flexible strap member.

11. The bundling tie of claim 1 including:

only a single opening through said first or second portion of said flexible strap member.

* * * * *